(12) United States Patent
Yasuda et al.

(10) Patent No.: US 8,094,126 B2
(45) Date of Patent: Jan. 10, 2012

(54) MOBILE APPARATUS INCLUDING INPUT SECTIONS CAPABLE OF DISPLAYING ONE OR MORE IMAGES

(75) Inventors: Takahiko Yasuda, Sagamihara (JP);
Masanori Katayanagi, Uenohara (JP);
Tomonori Sunazuka, Hino (JP)

(73) Assignee: Fujitsu Toshiba Mobile Communications, Kawasaki (JP)

( * ) Notice: Subject to any disclaimer, the term of this patent is extended or adjusted under 35 U.S.C. 154(b) by 429 days.

(21) Appl. No.: 12/392,244

(22) Filed: Feb. 25, 2009

(65) Prior Publication Data

US 2010/0016027 A1    Jan. 21, 2010

(30) Foreign Application Priority Data

Jul. 18, 2008 (JP) ............................... P2008-187750

(51) Int. Cl.
*G06F 3/02* (2006.01)
*G09G 5/00* (2006.01)
(52) U.S. Cl. ..................... 345/170; 345/173; 455/566
(58) Field of Classification Search ............... 455/550.1, 455/566, 567, 575.3, 575.4; 345/156, 168–173, 345/1.1, 87, 204, 207
See application file for complete search history.

(56) References Cited

U.S. PATENT DOCUMENTS

2006/0164395 A1* 7/2006 Eldon et al. ................... 345/168
2007/0275764 A1* 11/2007 Choi ............................. 455/566

FOREIGN PATENT DOCUMENTS

JP       2003-303526 A       10/2003

* cited by examiner

*Primary Examiner* — Shawki S Ismail
*Assistant Examiner* — Jany Tran
(74) *Attorney, Agent, or Firm* — Maschoff Gilmore & Israelsen

(57) ABSTRACT

According to one aspect of the invention, there is provided a mobile apparatus including: a plurality of input sections each configured to display at least one image that corresponds to an input value assigned thereto; a plurality of label areas provided correspondingly to the plurality of input sections, each of the label areas labeled with at least one characters associated with the input value that is assigned to a corresponding one of the plurality of input sections; a photosensor configured to measure ambient illuminance; and a display controller configured to control turn-off and turn-on of image-display at the plurality of input sections based on the ambient illuminance.

10 Claims, 12 Drawing Sheets

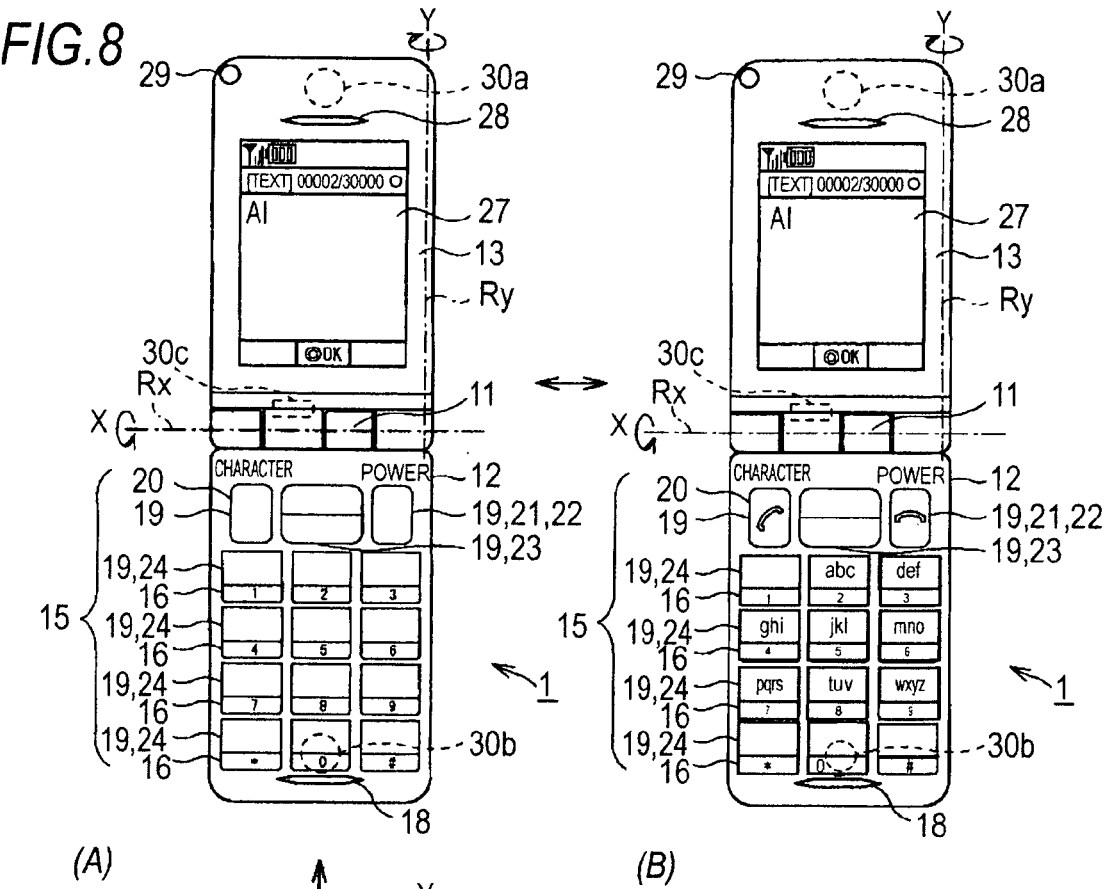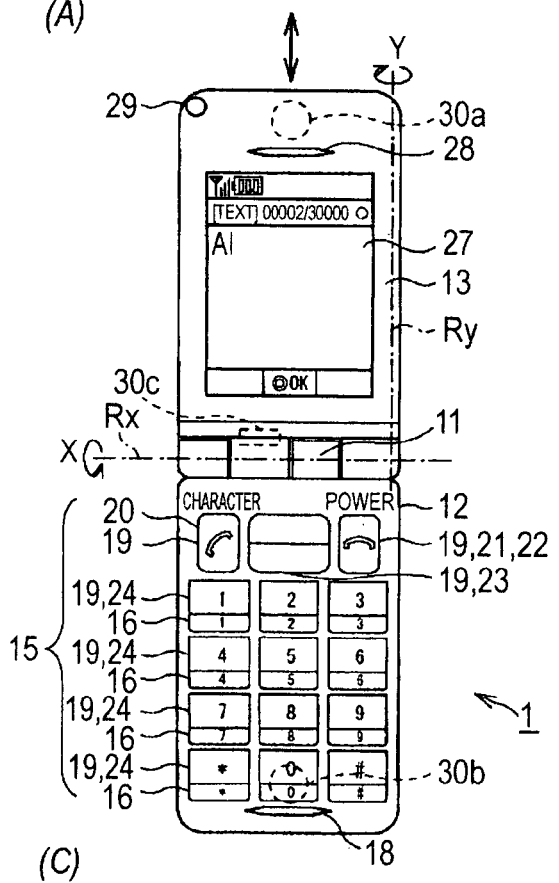

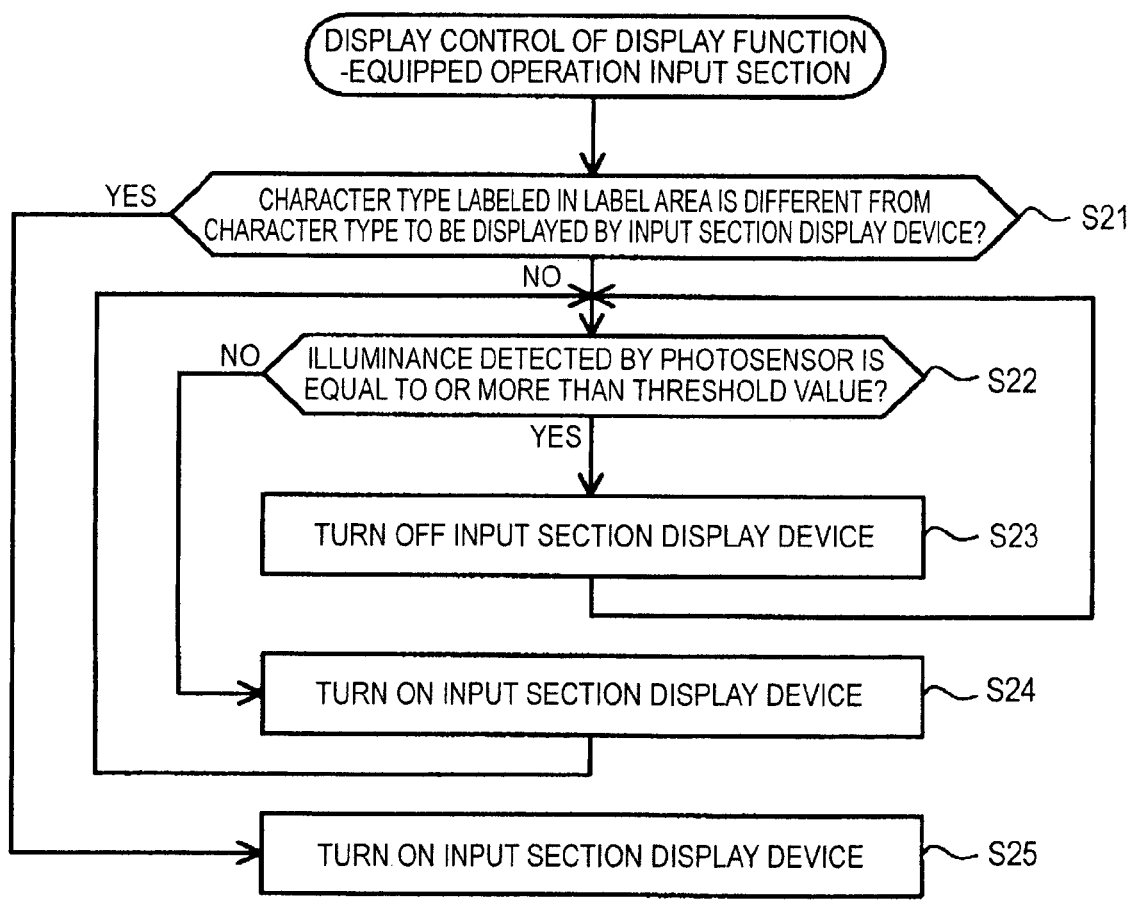

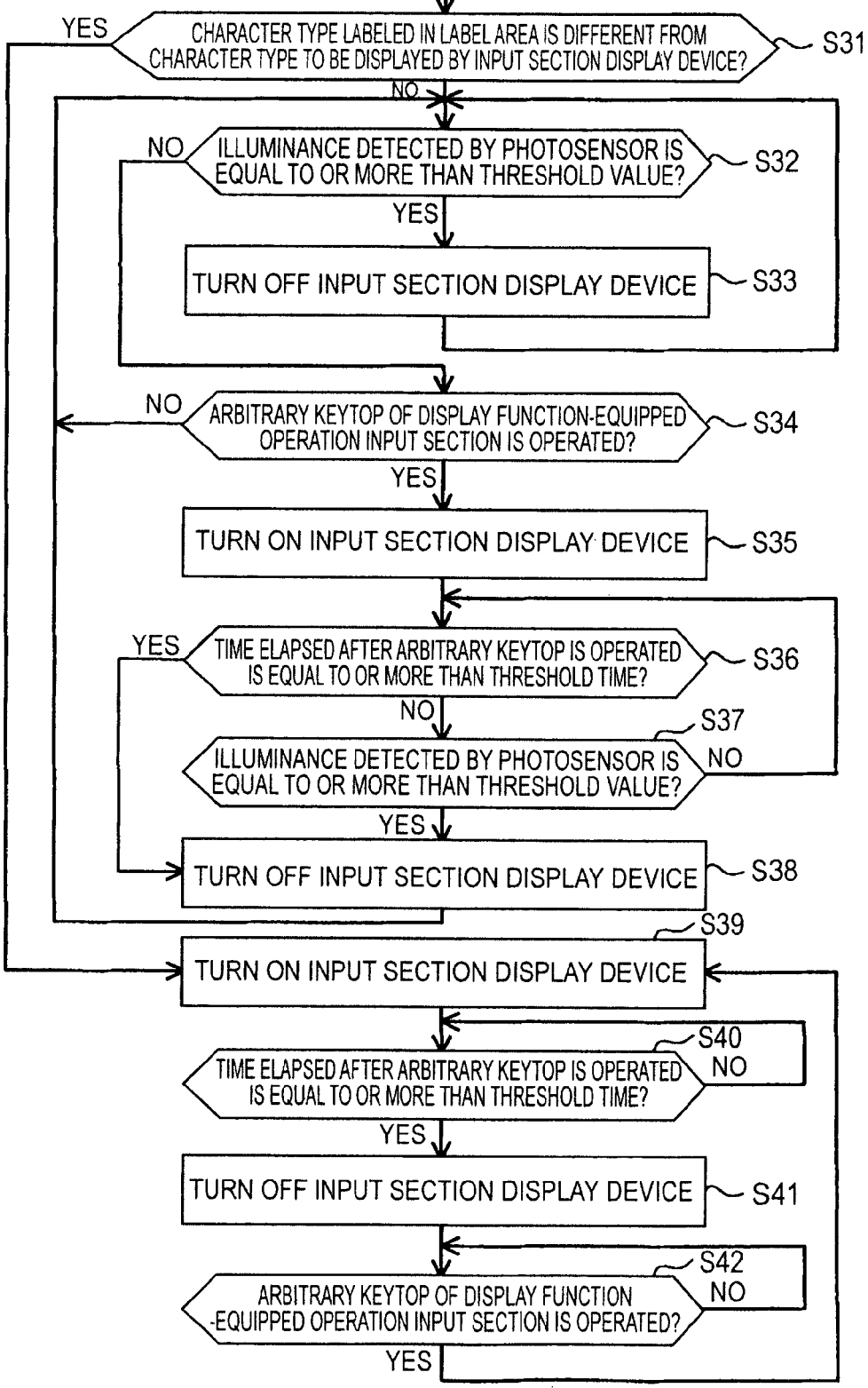

MOBILE APPARATUS INCLUDING INPUT SECTIONS CAPABLE OF DISPLAYING ONE OR MORE IMAGES

The entire disclosure of Japanese Patent Application No. 2008-187750 filed on Jul. 18, 2008, including specification, claims, drawings and abstract is incorporated herein by reference in its entirety.

BACKGROUND

1. Field of the Invention

One aspect of the present invention relates to a mobile apparatus including input sections capable of displaying images.

2. Description of the Related Art

In general, a mobile apparatus, such as a mobile phone or a mobile information terminal, includes a main display that displays text information or image information, and an input device that has input sections, such as a plurality of push-button switches.

Typically, the push-button switches are configured such that the input values individually assigned to the push-button switches can be identified by labels, such as engraved marks or prints, on the keytops thereof.

To further increase visual effect, there is a technology which provides a light-emitting diode in each push-button switch. As the switch is switched, the light-emitting diode is switched between an emission state and a non-emission state or changes colors.

A mobile apparatus described in JP-A-2003-303526 includes push-button switches having keytops without prefixed labels, but images can be displayed on the keytops.

In the mobile apparatus, the images are displayed on the keytops of the push-button switches, such that the input values assigned to the push-button switches can be identified. That is, in order to identify the input values assigned to the push-button switches, it is necessary to continuously display the images on the keytops.

In the mobile apparatus, however, the images are displayed on the keytops, and accordingly power is constantly consumed.

The mobile apparatus includes a battery serving as a power supply section, and the battery has limited discharge capacity. For this reason, in the mobile apparatus that continuously displays the images on the keytops, the battery is discharged within a short time, and an available time is shortened.

SUMMARY

According to one aspect of the invention, there is provided a mobile apparatus including: a plurality of input sections each configured to display at least one image that corresponds to an input value assigned thereto; a plurality of label areas provided correspondingly to the plurality of input sections, each of the label areas labeled with at least one characters associated with the input value that is assigned to a corresponding one of the plurality of input sections; a photosensor configured to measure ambient illuminance; and a display controller configured to control turn-off and turn-on of image-display at the plurality of input sections based on the ambient illuminance.

BRIEF DESCRIPTION OF THE DRAWINGS

Embodiment may be described in detail with reference to the accompanying drawings, in which:

FIG. 8 is an exemplary front view showing states where the foldable mobile phone is unfolded, wherein examples of a display state of the display function-equipped operation input section are shown;

FIG. 9 is a flowchart showing yet another example of display control of the display function-equipped operation input section in the foldable mobile phone;

FIG. 10 is a flowchart showing yet another example of display control of the display function-equipped operation input section in the foldable mobile phone;

DETAILED DESCRIPTION OF THE EMBODIMENTS

Figure 1A:
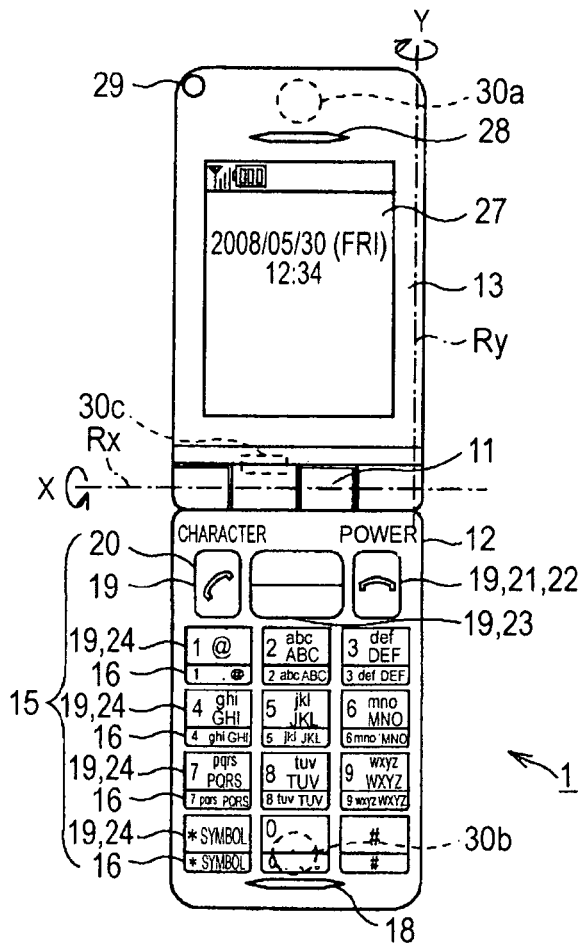
FIGS. 1A to 1D are exemplary exterior views of a foldable mobile phone which is an example of a mobile apparatus according to the invention.
Figure 1B:
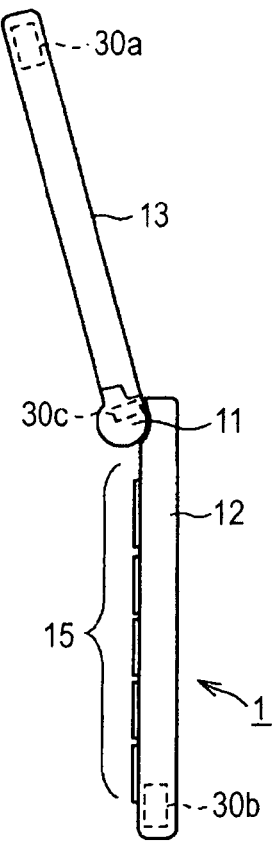
Figure 1C:
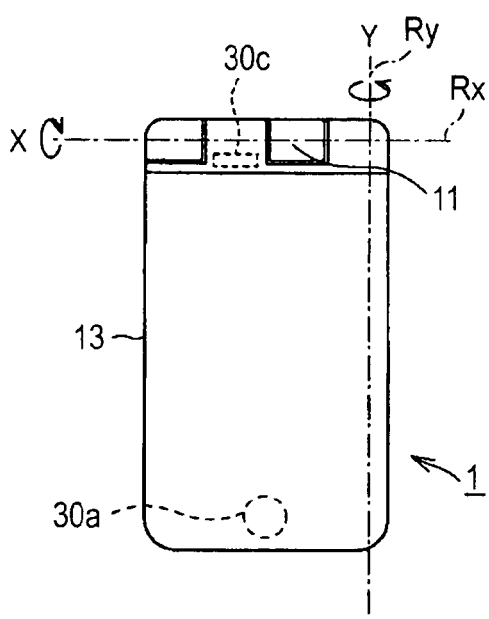
Figure 1D:
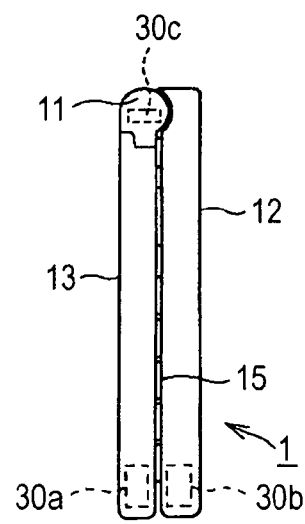

A mobile apparatus according to an embodiment of the invention will be described with reference to FIGS. 1A to 12. FIGS. 1A to 1D are exterior views of a foldable mobile phone which is an example of the mobile apparatus according to the invention. Specifically, FIG. 1A is a front view showing a state where the mobile phone is unfolded, and FIG. 1B is a side view showing a state where the foldable mobile phone which is an example of the mobile apparatus according to the invention is unfolded. FIG. 1C is a front view showing a state where the mobile phone is folded, and FIG. 1D is a side view showing a state where the foldable mobile phone which is an example of the mobile apparatus according to the invention is folded.

As shown in FIGS. 1A to 1D, the mobile phone 1 includes a hinge 11, a first casing 12, and a second casing 13. The first casing 12 and the second casing 13 are hinged by the hinge 11 at its central portion. The mobile phone 1 is formed to be foldable in directions of arrows X and Y through the hinge 11. As shown in FIGS. 1C and 1D, the mobile phone 1 is folded by rotating the first casing 12 and the second casing 13 around the hinge 11. In this case, the first casing 12 and the second casing 13 substantially overlap each other.

At a front of the first casing 12, a display function-equipped operation input section 15, label areas 16, and a microphone 18 are provided.

The display function-equipped operation input section 15 has a plurality of keytops 19 (input sections) without prefixed picture thereon, but arbitrary characters or symbols can be displayed on the keytops 19. The display function-equipped operation input section 15 accepts an operation input of the mobile phone 1. Each keytop 19 is assigned with a plurality of input values. Each time an operation is performed, each of the keytops 19 is sequentially switched between the input values. Thus, a plurality of input values can be input for each keytop 19. In this case, an image to be displayed on the keytop 19 may include all available input values, or may be changed according to input values each time an operation is performed.

If the mobile phone 1 is unfolded in the direction of the arrow X, a rotation axis Rx is located upward, and images are displayed on the keytops 19 in the display function-equipped operation input section 15. In the display function-equipped operation input section 15, at least one of character types, such as numerals from "0" to "9", alphabetic characters from "a" to "z", alphabetic characters from "A" to "Z", and symbols, such as "@", "/", and the like, and an arbitrary image can be displayed. As occasion demands, the display function-equipped input section 15 may be in a non-display state. The keytops 19 are individually assigned to a send key 20, an end key 21, a power key 22, a character type selection key 23, and a character input operation key 24. If one of the send key 20, the end key 21, the power key 22, the character type selection key 23, and the character input operation key 24 is pressed, an input value corresponding to the key is input to the mobile phone 1.

The label areas 16 are provided near the keytops 19. The label areas 16 are respectively provided to a corresponding keytop 19. The label areas 16 have characters or symbols engraved or printed on the first casing 12. Specifically, in each of the label areas 16, at least one of character types, such as the numerals from "0" to "9", alphabetic characters from "a" to "z", alphabetic characters from "A" to "Z", and symbols, such as "@", "/", and the like, is labeled. Each of the label areas 16 is labeled associated with at least one of the input values of a corresponding keytop 19. For example, when the input values assigned to a keytop 19 is "1", alphabetic characters "a" to "c", and alphabetic characters "A" to "C", at least one of "1", alphabetic characters "abc", and alphabetic characters "ABC" is labeled in the label area 16. The label areas 16 may be a plate-shaped member that covers the face of the first casing 12.

The microphone 18 is provided at the other end of the first casing 12 opposite to one end of the first casing 12 at which the hinge 11 is formed. The microphone 18 collects a user's voice during calling, and converts the collected voice into an electrical signal.

A battery pack (not shown) is provided at a rear of the first casing 12. If the power key 22 is operated, the mobile phone 1 starts to be operable by power supplied from the battery pack.

At a front of the second casing 13, a main display device 27, a speaker 28, and a photosensor 29 are provided.

The main display device 27 is formed by a Liquid Crystal Display (LCD), an organic Electro Luminescence Display (EL display), an Inorganic Electro Luminescence Display (inorganic EL display), a Surface-conduction Electron-emitter Display (SED), or the like.

The main display device 27 displays a reception state of an electric wave, a residual battery charge, the name or telephone number of a person to call registered in the directory, a transmission history, the content of an electronic mail, a simplified homepage, and contents received from an external contents server (not shown).

The speaker 28 is provided at the other end of the second casing 13 opposite to one end of the second casing 13 at which the hinge 11 is formed. The speaker 28 outputs a voice from a received signal which is acquired from the person to call during calling. A user can perform a voice call by using the microphone 18 and the speaker 28 of the first casing 12.

A speaker (not shown), other than the speaker 28, serving as a speech output section, is provided at a position of the mobile phone 1.

The photosensor 29 is an illuminance sensor which detects illuminance of an environment to which the mobile phone 1 is exposed. The photosensor 29 is disposed at a position sufficiently away from the main display device 27 on the front of the second casing 13 so as to detect illuminance without being disturbed by light emitted from the main display device 27. Magnetic measuring sections 30a, 30b, and 30c are provided at positions inside the first casing 12 and the second casing 13 to detect the folded/unfolded state of the mobile phone 1.

Figure 2:
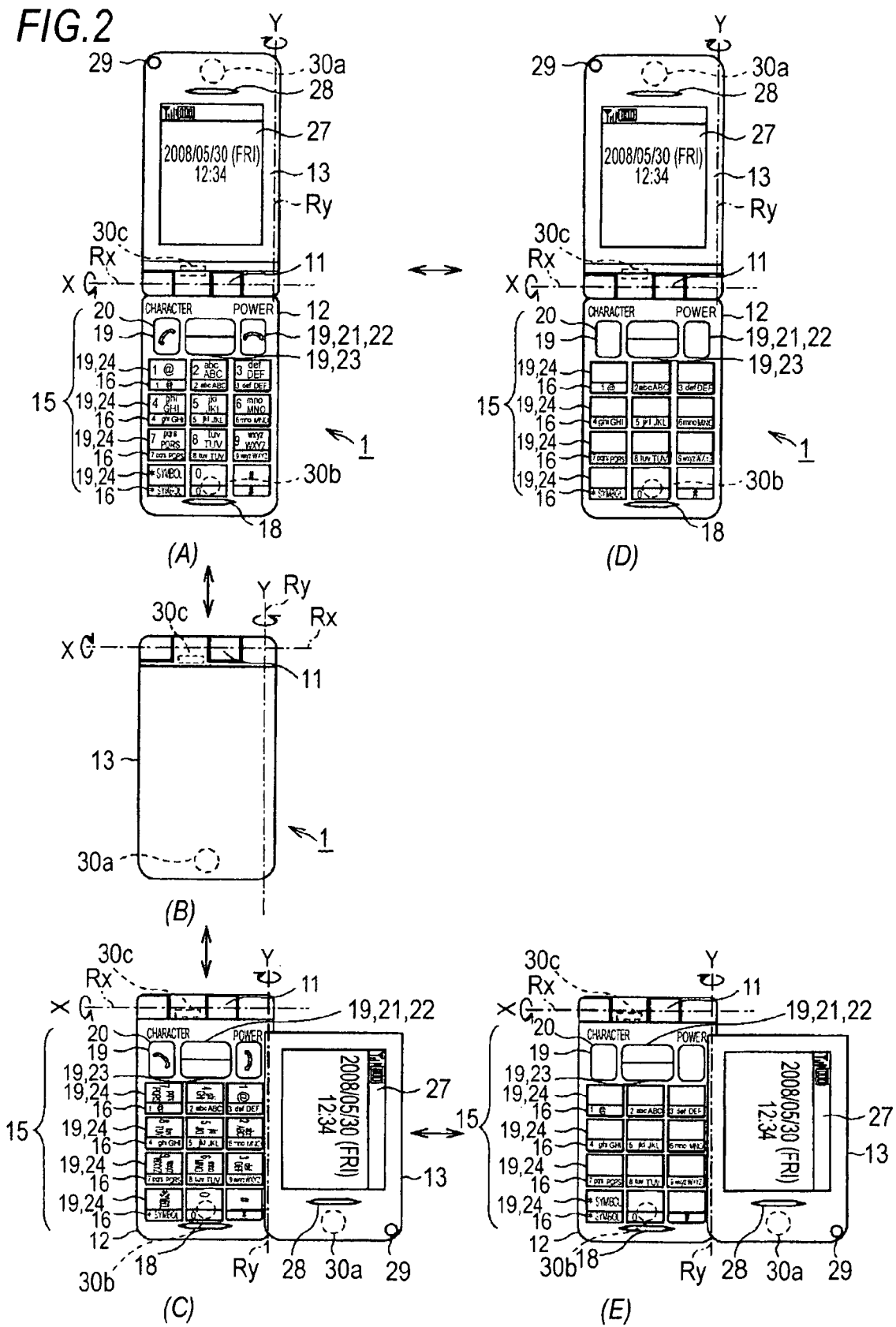
FIG. 2 shows an exemplary change in state of the foldable mobile phone.

FIG. 2 is a diagram showing states that the foldable mobile phone which is an example of the mobile apparatus according to the invention can take. Specifically, in FIG. 2, section (A) is a diagram showing a state where the foldable mobile phone is unfolded, like the state of FIG. 1A, and section (B) is a diagram showing a state where the first casing 12 and the second casing 13 are rotated around the hinge 11 from the state shown in FIG. 2, section (A) and folded. Section (C) is a diagram showing a state where the mobile phone 1 is unfolded in the direction of the arrow Y from the folded state shown in FIG. 2, section (B) through the hinge 11. In this case, in the display function-equipped operation input section 15, a rotation axis Ry is located upward, and the images are displayed on the keytops 19. Section (D) is a diagram showing a state where no images are displayed on the keytops 19 of the display function-equipped operation input section 15 in the state of section (A). Similarly, section (E) is a diagram showing a state where no images are displayed on the keytops 19 of the display function-equipped operation input section 15 in the state of section (C).

A case in which the mobile phone 1 is unfolded in the direction of the arrow X through the hinge 11 (FIG. 2, section (A)) is called a "vertically unfolded state", and a case in which the mobile phone 1 is unfolded in the direction of the arrow Y through the hinge 11 (FIG. 2, section (C)) is called a "horizontally unfolded state". Based on the detection results of the magnetic measuring sections 30a, 30b, and 30c, it is determined whether the mobile phone 1 is in the vertically unfolded state, the horizontally unfolded state, or the folded state.

Figure 3:
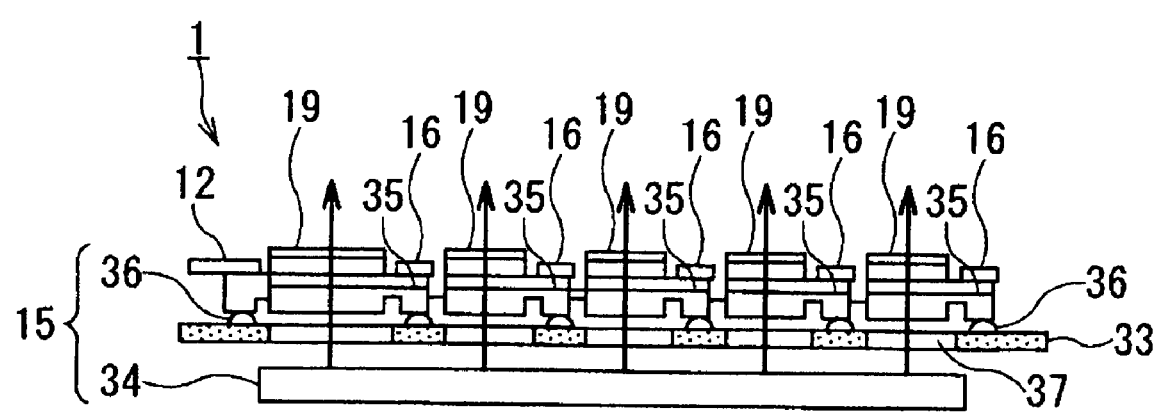
FIG. 3 is an exemplary partial sectional view of a display function-equipped operation input section in the foldable mobile phone.

FIG. 3 is a partial sectional view of the display function-equipped input section of the foldable mobile phone which is an example of the mobile apparatus according to the invention. As shown in FIG. 3, the display function-equipped operation input section 15 includes a plurality of keytops 19, a switch circuit board 33, and an input section display device 34.

Each of the keytops 19 is formed of a transparent member, through which the input section display device 34 disposed at the rear of the keytop 19 can be viewed. At a side of the keytop 19, a protrusion 35 is formed. The protrusion 35 is formed at a position where there is no influence on observation of an image to be displayed on the input section display device 34.

The protrusion 35 is sandwiched between the first casing 12 and the switch circuit board 33, and thus the keytop 19 is held.

The switch circuit board 33 has a plurality of contacts 36 corresponding to the keytops 19, wirings (not shown) for connecting the contacts 36, and a switch circuit having an insulating layer. The switch circuit board 33 has openings 37, through which display light L from the input section display device 34 transmits, directly below the keytops 19. The user views images displayed on the input section display device 34 through the openings 37 of the switch circuit board 33 and the keytops 19.

The images displayed on the input section display device 34 and viewed by the user through the keytops 19 are called "keytop display images".

The input section display device 34 is disposed at the rear of the switch circuit board 33. The input section display device 34 is formed by a display that is thin, lightweight, and realizes low power consumption. Specifically, the input section display device 34 is a Liquid Crystal Display (LCD), an Electro Luminescence Display (organic EL display), an Inorganic Electro Luminescence Display (inorganic EL display), a Surface-conduction Electron-emitter Display (SED), or the like.

The display function-equipped operation input section 15 may include the input section display device 34 and a touch panel through which an image displayed on the input section display device 34 transmits.

Figure 4:
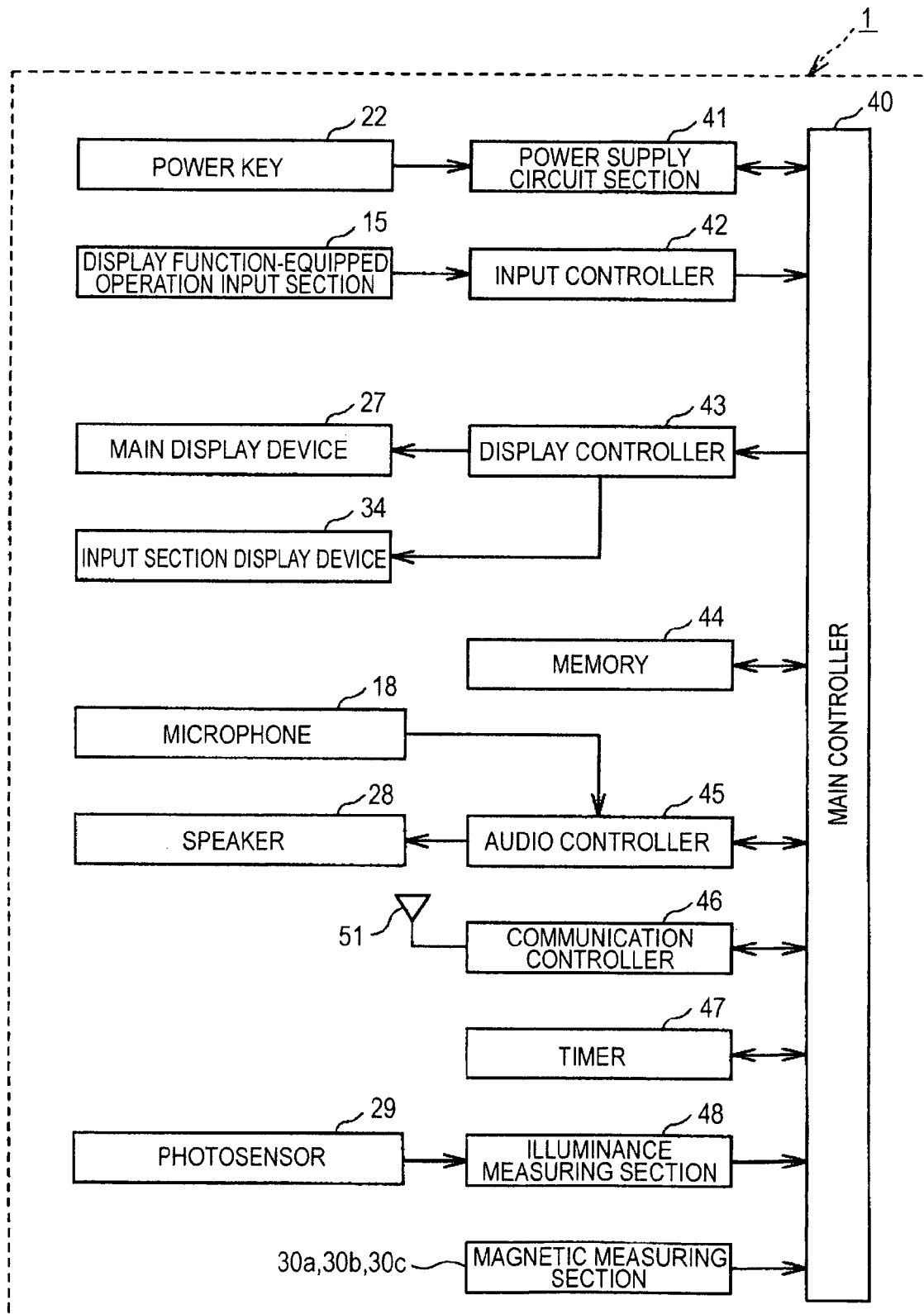
FIG. 4 is an exemplary block diagram showing the foldable mobile phone.

FIG. 4 is a block diagram showing the foldable mobile phone which is an example of the mobile apparatus according to the invention. As shown in FIG. 4, the mobile phone 1 includes a main controller 40, a power supply circuit section 41, an input controller 42, a display controller 43, a memory 44, a audio controller 45, a communication controller 46, a timer 47, an illuminance measuring section 48, and magnetic measuring sections 30a, 30b, and 30c, all of which are communicably connected to each other through a bus.

The main controller 40 includes a Central Processing Unit (CPU). The main controller 40 generates various control signals and supplies the control signals to the individual sections to thereby overall control the mobile phone 1. The main controller 40 performs, for example, an input control process for the input controller 42, and various arithmetic processes or control processes.

The power key 22 and the battery pack are connected to the power supply circuit section 41. If the user presses the power key 22, the power key 22 outputs an operation signal. If the operation signal is input, the power supply circuit section 41 generates a signal indicative of the input of the operation signal and outputs the signal to the main controller 40, and simultaneously switches the mobile phone 1 between an operation state and a stop state. If the mobile phone 1 is in the operation state, the power supply circuit section 41 supplies power to the individual sections from the battery pack.

The input controller 42 is connected to the display function-equipped operation input section 15. If a keytop 19 of the display function-equipped operation input section 15 is pressed, an operation signal corresponding to the pressed keytop 19 is generated and output to the main controller 40.

The display controller 43 is connected to the main display device 27 and the input section display device 34. The display controller 43 invalidates or validates display of the main display device 27 and the input section display device 34 under the control of the main controller 40. The display controller 43 also controls the main display device 27 to display document data or image data under the control of the main controller 40. The display controller 43 controls the input section display device 34 to display a keytop display image under the control of the main controller 40.

The audio controller 45 is connected to the microphone 18. The audio controller 45 converts an analog speech signal output from the microphone 18 into a digital speech signal, and outputs the digital speech signal to the communication controller 46 under the control of the main controller 40. The audio controller 45 also converts a digital speech signal from among received signals output from the communication controller 46 into an analog speech signal, and outputs the analog speech signal to the speaker 28 under the control of the main controller 40. The speaker 28 converts the analog speech signal and outputs a voice.

The communication controller 46 performs spectrum despreading on an electric wave received from a base station through an antenna 51 to restore a received signal under the control of the main controller 40. The received signal is input to the audio controller 45 and output from the speaker 28, is input to the display controller 43 and displayed on the main display device 27, or is recorded in the memory 44 according to a command from the main controller 40. The communication controller 46 also acquires the digital speech signal output from the audio controller 45, the operation signal output from the input controller 42, and the information signal stored in the memory 44 under the control of the main controller 40, performs spectrum spreading on the signals, and transmits the signals from the antenna 51 to the base station.

With respect to the process to be performed by the main controller 40, the memory 44 stores processing programs or information signals required for the process. The memory 44 includes a Read Only Memory (ROM) or hard disk, a nonvolatile memory, a Random Access Memory (RAM) which temporarily stores data to be used when the main controller 40 performs the process, and the like.

The timer 47 generates a reference time signal which is referred to by the individual sections of the mobile phone 1. The photosensor 29 is connected to the illuminance measuring section 48. When the illuminance detected by the photosensor 29 is bright so as to be equal to more than a threshold value, the illuminance measuring section 48 outputs a display stop signal of the input section display device 34 to the display controller 43. When the illuminance detected by the photosensor 29 is dark so as to be less than the threshold value, the illuminance measuring section 48 outputs a display start signal of the input section display device 34 to the display controller 43.

The illuminance measuring section 48 may convert the illuminance detected by the photosensor 29 into stepwise illuminance level signals corresponding to a plurality of threshold values and may output the illumination level signals. In this case, the display controller 43 can control the brightness of the input section display device 34 in a stepwise manner according to the illuminance level signals output from the illuminance measuring section 48. Specifically, when the illuminance of an environment to which the mobile phone 1 is exposed is bright so as to be equal to or more than the threshold value, the display controller 43 turns off the input section display device 34. When the illuminance of the environment to which the mobile phone 1 is exposed is dark so as to be less than the threshold value, as the illuminance of the environment to which the mobile phone 1 is exposed is darker, the display controller 43 turns on the input section display device 34 with dark brightness. As the illuminance of the environment to which the mobile phone 1 is exposed is brighter, the input section display device 34 is lighted up brighter.

The magnetic measuring sections 30a, 30b, and 30c determine based on a combination of magnetic detection and non-magnetic detection whether the mobile phone 1 is unfolded in the X direction, is unfolded in the Y direction, or the closed direction, and outputs the determination result to the main controller 40.

Next, a display operation of the display function-equipped operation input section 15 of the mobile phone 1 according to this embodiment will be described. Here, a keytop display image to be displayed in the display function-equipped operation input section 15 is illustrated.

Figure 5:
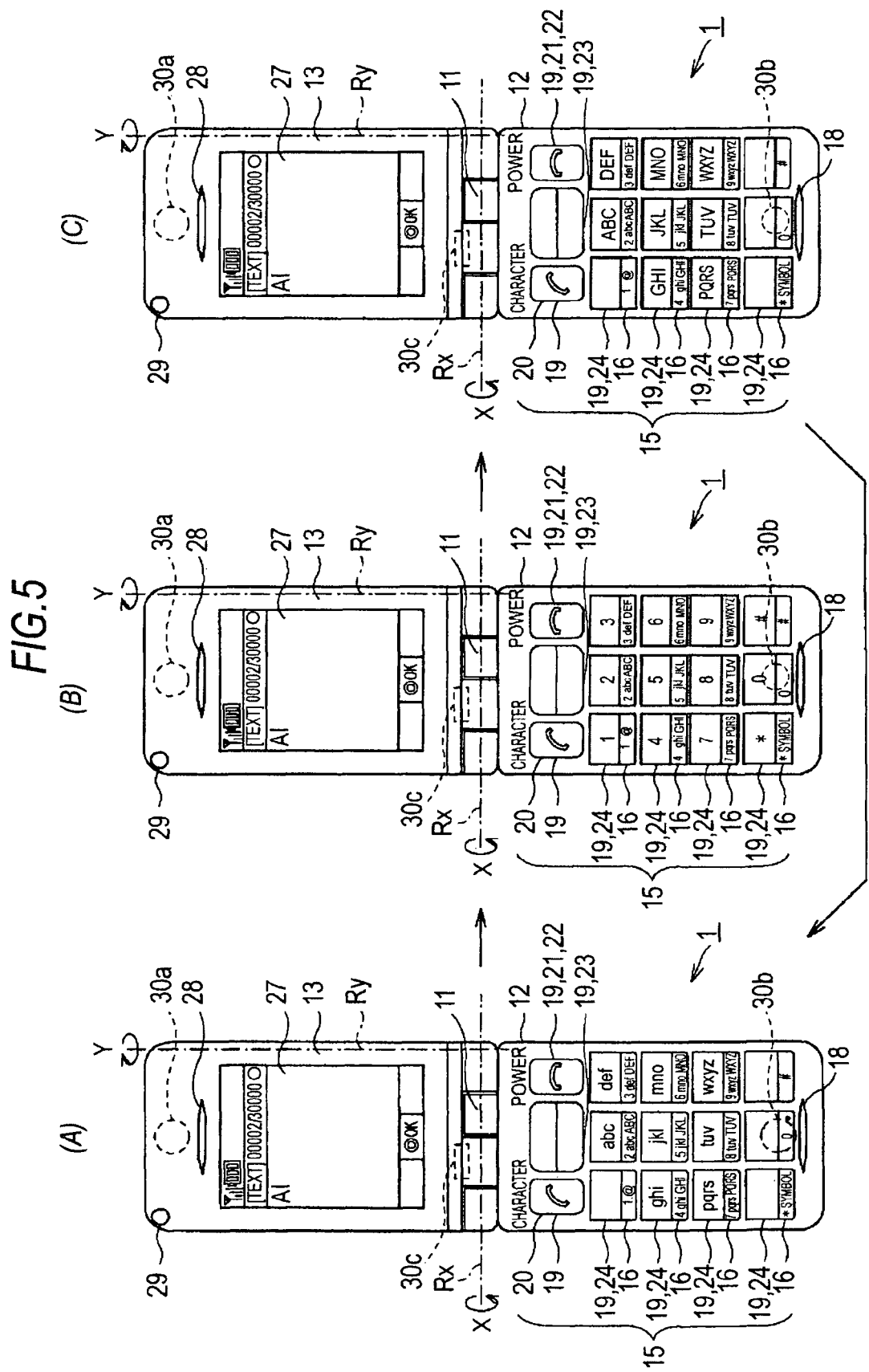
FIG. 5 is an exemplary front view showing states where the foldable mobile phone is unfolded, wherein examples of a display state of the display function-equipped operation input section are shown.

FIG. 5 shows front views of the foldable mobile phone which is an example of the mobile apparatus according to the invention is unfolded. In FIG. 5, sections (A) to (C) are diagrams showing an example of a display state of the display function-equipped operation input section.

As shown in section (A), for example, numerals from "0" to "9", alphabetic characters from "a" to "z", alphabetic characters from "A" to "Z", or symbols, such as "@" and the like, are labeled in the label areas 16 of the mobile phone 1. In contrast, alphabetic characters from "a" to "z" are displayed on the keytops 19 as the keytop display images.

As shown in section (B), for example, numerals from "0" to "9", alphabetic characters from "a" to "z", alphabetic characters from "A" to "Z", or symbols, such as "@" and the like, are labeled in the label area 16 of the mobile phone 1. In contrast, numerals from "0" to "9" and symbols, such as ".", ",", and the like, are displayed on the keytops 19 as the keytop display images.

As shown in section (C), for example, numerals from "0" to "9", alphabetic characters from "a" to "z", alphabetic characters from "A" to "Z", or symbols, such as "@" and the like, are labeled in the label areas 16 of the mobile phone 1. In contrast, alphabetic characters from "A" to "Z" are displayed on the keytops 19 as the keytop display images. In FIG. 5, sections (A) to (C), if the character type selection key 23 is pressed, an input character type when a keytop 19 or a label area 16 is pressed varies. For example, in the state of FIG. 5, section (A), an alphabet (lower case) input mode is performed. In this state, if the character type selection key 23 is pressed once, the state of FIG. 5, section (B) arises, and a numeral input mode is performed. In the state of FIG. 5, section (B), if the character type selection key 23 is pressed again, the state of FIG. 5, section (C) arises and an alphabet (uppercase) input mode is performed. In the state of FIG. 5, section (C), if the character type selection key 23 is pressed again, the state of FIG. 5, section (A) is returned and the alphabet (lower case) input mode is performed.

Figure 6:
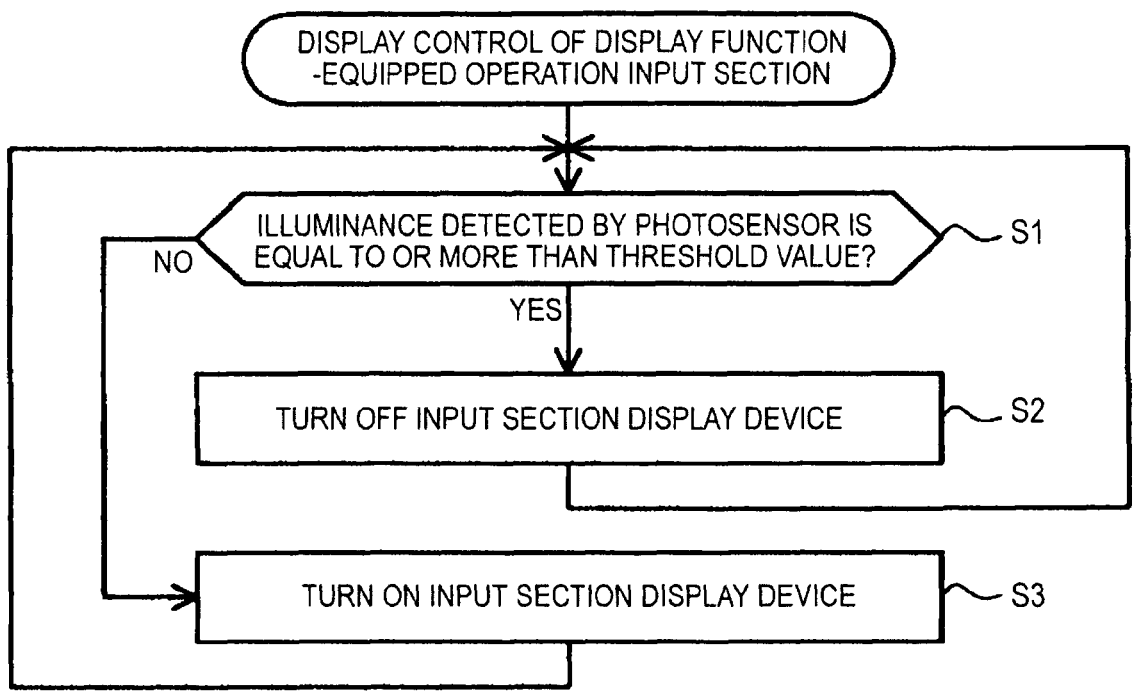
FIG. 6 is an exemplary flowchart showing display control of the display function-equipped operation input section in the foldable mobile phone.

FIG. 6 is a flowchart showing display control of the display function-equipped operation input section in the foldable mobile phone which is an example of the mobile apparatus according to the invention.

As shown in FIG. 6, when the mobile phone 1 is supplied with power and activated, first, in Step S1, the illuminance measuring section 48 compares the illuminance detected by the photosensor 29 with the threshold value. When the illuminance detected by the photosensor 29 is equal to or more than the threshold value, the illuminance measuring section 48 determines that the environment to which the mobile phone 1 is exposed is bright and outputs the display stop signal. Next, the process progresses to Step S2. Otherwise, the illuminance measuring section 48 determines that the environment to which the mobile phone 1 is exposed is dark and outputs the display start signal. Next, the process progresses to Step S3.

Next, in Step S2, the main controller 40 inputs the display stop signal output from the illuminance measuring section 48 to the display controller 43. The display controller 43 turns off the input section display device 34 or maintains a turning-off state of the input section display device 34 based on the display stop signal, and then the process returns to Step S1. In this case, since the environment to which the mobile phone 1 is exposed is bright, as shown in FIG. 2, section (D), the user can recognize the characters or symbols assigned to the keytops 19 from the indication of the label areas 16. Therefore, when the environment to which the mobile phone 1 is exposed is bright, the mobile phone 1 controls the input section display device 34 so as not to emit light, and thus the amount of power consumption of the battery pack can be suppressed.

Next, in Step S3, the main controller 40 inputs the display start signal output from the illuminance measuring section 48 to the display controller 43. The display controller 43 turns on the input section display device 34 or maintains a turning-on state of the input section display device 34 based on the display start signal, and then the process returns to Step S1. In this case, since the environment to which the mobile phone 1 is exposed is dark, as shown in FIG. 2, section (A), the user can recognize the characters or symbols assigned to the keytops 19 from the keytop display images. In addition, as shown in FIG. 5, sections (A) to (C), the display controller 43 may control the keytop display images to be displayed to correspond to character types to be input.

That is, the mobile phone 1 turns off the input section display device 34 when the environment to which the mobile phone 1 is exposed is bright, and turns on the input section display device 34 when the environment to which the mobile phone 1 is exposed is dark. The user can recognize the characters or symbols assigned to the keytops 19 from display of the label areas 16 when the environment to which the mobile phone 1 is exposed is bright, and recognize the characters or symbols assigned to the keytops 19 from the keytop display images when the environment to which the mobile phone 1 is exposed is dark. Therefore, the mobile phone 1 appropriately switches the turning-on state and the turning-off state of the input section display device 34 according to the use environment thereof, thereby suppressing power consumption.

Figure 7:
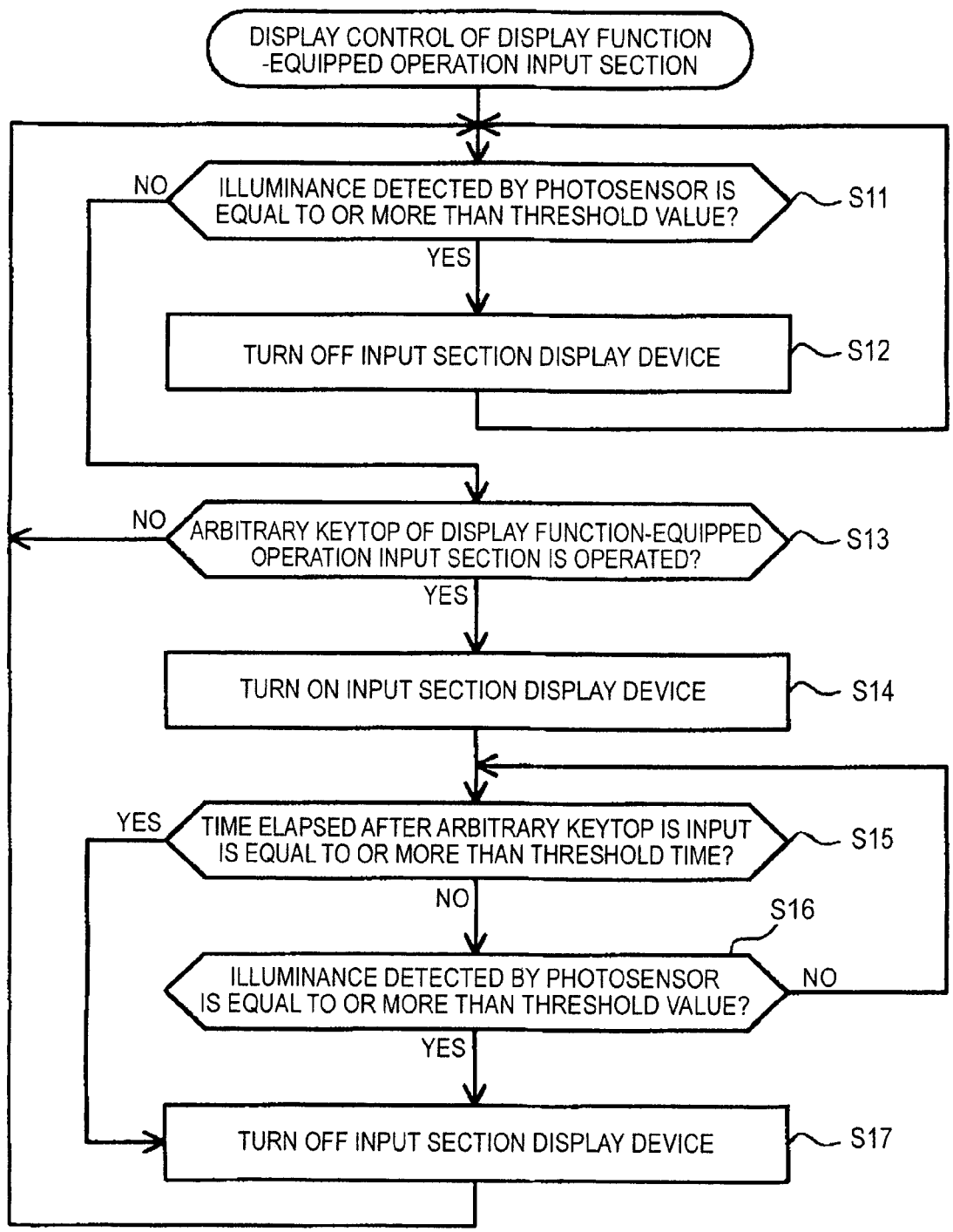
FIG. 7 is a flowchart showing another example of display control of the display function-equipped operation input section in the foldable mobile phone.

FIG. 7 is a flowchart showing another example of display control of the display function-equipped operation input section in the foldable mobile phone which is an example of the mobile apparatus according to the invention. As shown in FIG. 7, the mobile phone 1 does not immediately switch the turning-on state and the turning-off state of the input section display device 34 according to the use environment thereof, but it is not until the user starts to operate the mobile phone 1 that the mobile phone 1 turns on the input section display device 34. In addition, if a threshold time elapses after the input section display device 34 is turned on until the user next operates the mobile phone 1, the mobile phone 1 turns off the input section display device 34.

If the mobile phone 1 is supplied with power and activated, first, in Step S11, the illuminance measuring section 48 compares the illuminance detected by the photosensor 29 with the threshold value. When the illuminance detected by the photosensor 29 is equal to or more than the threshold value, the illuminance measuring section 48 determines that the environment to which the mobile phone 1 is exposed is bright and outputs the display stop signal. Next, the process progresses to Step S12. Otherwise, the illuminance measuring section 48 determines that the environment to which the mobile phone 1 is exposed is dark and outputs the display start signal. Next, the process progresses to Step S13.

Next, in Step S12, the main controller 40 inputs the display stop signal output from the illuminance measuring section 48 to the display controller 43. The display controller 43 turns off the input section display device 34 or maintains the turning-off state of the input section display device 34 based on the display stop signal, and then the process returns to Step S11. In this case, since the environment to which the mobile phone 1 is exposed is bright, as shown in FIG. 2, section (D), the user can recognize the characters or symbols assigned to the keytops 19 from the label areas 16. Therefore, when the environment to which the mobile phone 1 is exposed is bright, the mobile phone 1 controls the input section display device 34 so as not to emit light, thereby suppressing the amount of power consumption of the battery pack.

Next, in Step S13, the main controller 40 determines whether or not an arbitrary keytop 19 of the display function-equipped operation input section 15 is operated. Specifically, if an arbitrary keytop 19 of the display function-equipped operation input section 15 is operated, the input controller 42 outputs an arbitrary operation signal. The main controller 40 monitors presence/absence of the input of the arbitrary operation signal. When an arbitrary operation signal is input, the main controller 40 determines that an arbitrary keytop 19 of the display function-equipped operation input section 15 is operated, and then the process progresses to Step S14. Otherwise, the main controller 40 determines that an arbitrary keytop 19 of the display function-equipped operation input section 15 is not operated, and then the process returns to Step S11.

Next, in Step S14, the main controller 40 inputs the display start signal output from the illuminance measuring section 48 to the display controller 43. The display controller 43 turns on the input section display device 34 or maintains the turning-on state of the input section display device 34 based on the display start signal. In this case, since the environment to which the mobile phone 1 is exposed is dark, as shown in FIG. 2, section (A), the user can recognize the characters or symbols assigned to the keytops 19 from the keytop display images. In addition, as shown in FIG. 5, sections (A) to (C), the display controller 43 may control the keytop display images to be displayed to correspond to character types to be input.

Next, in Step S15, the input controller 42 compares a threshold time with a time elapsed after an arbitrary keytop 19 of the display function-equipped operation input section 15 is operated. Specifically, the input controller 42 compares a threshold time with a time elapsed after an arbitrary operation signal is output. When the time elapsed after the arbitrary operation signal is output is equal to or more than the threshold time, the input controller 42 determines that no operation of the mobile phone 1 by the user is performed within the threshold time and outputs an operation stop signal. Next, the process progresses to Step S17. Otherwise, the input controller 42 determines that an operation of the mobile phone 1 by the user is performed within the threshold time and outputs an operation continuation signal. Next, the process progresses to Step S16.

Next, in Step S16, the illuminance measuring section 48 compares the illuminance detected by the photosensor 29 with the threshold value. When the illuminance detected by the photosensor 29 is equal to or more than the threshold value, the illuminance measuring section 48 determines that the environment to which the mobile phone 1 is exposed is bright and outputs the display stop signal. Next, the process progresses to Step S17. Otherwise, the illuminance measuring section 48 determines that the environment to which the mobile phone 1 is exposed is dark and outputs the display start signal. Next, the process progresses to Step S15.

Next, in Step S17, the main controller 40 inputs the display stop signal output from the illuminance measuring section 48 to the display controller 43. The display controller 43 turns off the input section display device 34 based on the display stop signal, and then the process returns to Step S11. In this case, even if the environment to which the mobile phone 1 is exposed is dark, no operation of the mobile phone 1 by the user is performed within the threshold time. For this reason, it is determined that the need for perceiving the characters or symbols assigned to the keytops 19 is reduced. Therefore, even if the environment to which the mobile phone 1 is exposed is dark, the mobile phone 1 controls the input section display device 34 so as not to emit light, thereby suppressing the amount of power consumption of the battery pack.

That is, when the environment to which the mobile phone 1 is exposed is bright, the mobile phone 1 turns off the input section display device 34. In contrast, when the environment to which the mobile phone 1 is exposed is dark, the mobile phone 1 turns on or off the input section display device 34 according to presence/absence of the operation of the mobile phone 1 by the user. When the environment to which the mobile phone 1 is exposed is bright, the user recognizes the characters or symbols assigned to the keytops 19 from the label areas 16. When the environment to which the mobile phone 1 is exposed is dark, if the mobile phone 1 is operated, the user recognizes the characters or symbols assigned to the keytops 19 from the keytop display images. Therefore, the mobile phone 1 appropriately switches the turning-on state and the turning-off state of the input section display device 34 according to presence/absence of the user's operation, thereby suppressing power consumption.

FIG. 8, sections (A) to (C) are front views showing a state where the foldable mobile phone which is an example of the mobile apparatus according to the invention is unfolded. FIG. 8 shows examples of a display state of the display function-equipped operation input section.

In the mobile phone 1 shown in FIG. 8, no sufficient areas cannot be allocated for the label areas 16, and only one character type from among the input values assigned to the keytops 19 is labeled in the label areas 16.

As shown in FIG. 8, section (A), for example, numerals from "0" to "9", ".", and "." are labeled in the label areas 16 of the mobile phone 1. No keytop display images are displayed on the keytops 19.

As shown in FIG. 8, section (B), for example, numerals from "0" to "9", ".", and "." are labeled in the label areas 16 of the mobile phone 1. In contrast, alphabetic characters from "a" to "z" are displayed on the keytops 19 as the keytop display images.

As shown in FIG. 8, section (C), for example, numerals from "0" to "9", ".", and "." are labeled in the label areas 16 of the mobile phone 1. In contrast, numerals from "0" to "9", ".", and "." are displayed on the keytops 19 as the keytop display images.

With respect to the states of FIG. 8, sections (A) to (C), for example, the following display control is performed on the display content (or a non-display state). FIG. 9 is a flowchart showing yet another example of display control of the display function-equipped operation input section in the foldable mobile phone which is an example of the mobile apparatus according to the invention.

As shown in FIG. 9, the mobile phone 1 turns on or off the input section display device 34 according to whether or not the character type labeled in the label areas 16 is same as the character type to be displayed by the input section display device 34.

If the mobile phone 1 is supplied with power and activated, first, in Step S21, the display controller 43 compares the character type labeled in the label areas 16 and the character type to be displayed by the input section display device 34. The character type labeled in the label areas 16 is recorded in the memory 44 in advance. In an early phase when the mobile phone 1 is supplied with power, the character type to be displayed by the input section display device 34 is determined as required in advance. Here, it is assumed that, for example, numerals from "0" to "9" are labeled in the label areas 16, and indication is recorded in the memory 44.

When the character type shown in the label areas 16 is different from the character type to be displayed by the input section display device 34, the display controller 43 outputs a different character type display preparation signal, and then the process progresses to Step S22. Otherwise, the display controller 43 outputs a "same character type display preparation signal", and then the process progresses to Step S25.

The fact that the character type labeled in the label areas 16 is different from the character type to be displayed by the input section display device 34, for example, means that the character type labeled in the label areas 16 is different from the character type of the keytop display images on the keytops 19, as shown in FIG. 8, section (B). Otherwise, as shown in FIG. 8, section (C), the character type labeled in the label area 16 is the same as the character type of the keytop display images on the keytops 19.

As shown in FIG. 2, section (C), when the mobile phone 1 is horizontally unfolded, and the display direction of a character in each of the label areas 16 is different from the display direction of an image to be displayed by the input section display device 34, it is considered that the character type labeled in the label areas 16 is different from the character type to be displayed by the input section display device 34.

Next, in Step S22, the illuminance measuring section 48 compares the illuminance detected by the photosensor 29 with the threshold value. When the illuminance detected by the photosensor 29 is equal to or more than the threshold value, the illuminance measuring section 48 determines that the environment to which the mobile phone 1 is exposed is bright and outputs the display stop signal. Next, the process progresses to Step S23. Otherwise, the illuminance measuring section 48 determines that the environment to which the mobile phone 1 is exposed is dark and outputs the display start signal. Next, the process progresses to Step S24.

Next, in Step S23, the main controller 40 inputs the display stop signal output from the illuminance measuring section 48 to the display controller 43. The display controller 43 turns off the input section display device 34 or maintains the turning-off state of the input section display device 34 based on the display stop signal, and then the process returns to Step S1. In this case, since the environment to which the mobile phone 1 is exposed is bright, as shown in FIG. 8, section (A), the user can recognize the characters or symbols assigned to the keytops 19 from display of the label areas 16. Therefore, when the environment to which the mobile phone 1 is exposed is bright, the mobile phone 1 controls the input section display device 34 so as not to emit light, thereby suppressing the amount of power consumption of the battery pack.

Next, in Step S24, the main controller 40 inputs the display start signal output from the illuminance measuring section 48 to the display controller 43. The display controller 43 turns on the input section display device 34 or maintains the turning-on state of the light section display device 34, and then the process returns to Step S22. In this case, since the environment to which the mobile phone 1 is exposed is dark, as shown in FIG. 8, section (C), the user can recognize the characters or symbols assigned to the keytops 19 from the keytop display images.

Next, in Step S25, the main controller 40 inputs the display start signal to the display controller 43 based on the different character type display preparation signal output from the display controller 43. The display controller 43 turns on the input section display device 34 based on the display start signal. In this case, even if the environment to which the mobile phone 1 is exposed is bright or dark, the user can recognize the characters or symbols assigned to the keytops 19 from display of the label areas 16, and as shown in FIG. 8, section (B), can recognize the characters or symbols assigned to the keytops 19 from the keytop display images.

That is, when the character type labeled in the label areas 16 is the same as the character type of the keytop display images, the mobile phone 1 appropriately switches the turning-on state and the turning-off state of the input section display device 34 according to the use environment thereof, thereby suppressing power consumption. In addition, when the character type labeled in the label areas 16 is different from the character type of the keytop display images, the mobile phone 1 turns on the input section display device 34, regardless of the use environment thereof. Therefore, the mobile phone 1 appropriately switches the turning-on state and the turning-off state of the input section display device 34 according to the use environment thereof and the character type labeled in the label areas 16, thereby suppressing power consumption.

When the display direction of a character displayed in each of the label areas 16 is different from the display direction of a character to be displayed by the input section display device 34, the mobile phone 1 turns on the input section display device 34, regardless of the use environment thereof.

FIG. 10 is a flowchart showing yet another example of display control of the display function-equipped operation input section in the foldable mobile phone which is an example of the mobile apparatus according to the invention.

As shown in FIG. 10, the mobile phone 1 controls turning-on or turning-off of the input section display device 34 according to whether the character type labeled in the label areas 16 is the same as the character type to be displayed by the input section display device 34. When the character type labeled in the label areas 16 is the same as the character type to be displayed by the input section display device 34, the mobile phone 1 does not immediately switch the turning-on state and the turning-off state of the input section display device 34 according to the use environment thereof, but it is not until the user starts to operate the mobile phone 1 that the mobile phone 1 turns on the input section display device 34. In addition, if a threshold time elapses after the input section display device 34 is turned on until the user next operates the mobile phone 1, the mobile phone 1 turns off the input section display device 34.

Step S31 of FIG. 10 is the same as Step S21 of FIG. 9, and thus a redundant description will be omitted.

In Step S32, the illuminance measuring section 48 compares the illuminance detected by the photosensor 29 with the threshold value. When the illuminance detected by the photosensor 29 is equal to or more than the threshold value, the illuminance measuring section 48 determines that the environment to which the mobile phone 1 is exposed is bright and outputs the display stop signal. Next, the process progresses to Step S33. Otherwise, the illuminance measuring section 48 determines that the environment to which the mobile phone 1 is exposed is dark and outputs the display start signal. Next, the process progresses to Step S34.

Next, in Step S33, the main controller 40 inputs the display stop signal output from the illuminance measuring section 48 to the display controller 43. The display controller 43 turns off the input section display device 34 or maintains the turning-off state of the input section display device 34 based on the display stop signal, and then the process returns to Step S32. In this case, since the environment to which the mobile phone 1 is exposed is bright, as shown in FIG. 8, section (A), the user can recognize the characters or symbols assigned to the keytops 19 from display of the label areas 16. Therefore, when the environment to which the mobile phone 1 is exposed is bright, the mobile phone 1 controls the input section display device 34 so as not to emit light, thereby suppressing the amount of power consumption of the battery pack.

Next, in Step S34, the main controller 40 determines whether or not an arbitrary keytop 19 of the display function-equipped operation input section 15 is operated. Specifically, if an arbitrary keytop 19 of the display function-equipped operation input section 15 is operated, the input controller 42 outputs an arbitrary operation signal. The main controller 40 monitors presence/absence of the input of the arbitrary operation signal. When an arbitrary operation signal is input, the main controller 40 determines that an arbitrary keytop 19 of the display function-equipped operation input section 15 is operated, and then the process progresses to Step S35. Otherwise, the main controller 40 determines that an arbitrary keytop 19 of the display function-equipped operation input section 15 is not operated, and then the process returns to Step S32.

Next, in Step S35, the main controller 40 inputs the display start signal output from the illuminance measuring section 48 to the display controller 43. The display controller 43 turns on the input section display device 34 or maintains the turning-on state of the light section display device 34 based on the display start signal. In this case, since the environment to which the mobile phone 1 is exposed is dark, as shown in FIG. 8, section (C), the user can recognize the characters or symbols assigned to the keytops 19 from the keytop display images.

Next, in Step S36, the input controller 42 compares a threshold time with a time elapsed after an arbitrary keytop 19 of the display function-equipped operation input section 15is operated. Specifically, the input controller 42 compares a threshold time with a time elapsed after an arbitrary operation signal is output. When the time elapsed after the arbitrary operation signal is output is equal to or more than the threshold time, the input controller 42 determines that no operation of the mobile phone 1 by the user is performed within the threshold time and outputs the operation stop signal. Next, the process progresses to Step S38. Otherwise, the input controller 42 determines that an operation of the mobile phone 1 by the user is performed within the threshold time and outputs an operation continuation signal. Next, the process progresses to Step S37.

Next, in Step S37, the illuminance measuring section 48 compares the illuminance detected by the photosensor 29 with the threshold value. When the illuminance detected by the photosensor 29 is equal to or more than the threshold value, the illuminance measuring section 48 determines that the environment to which the mobile phone 1 is exposed is bright and outputs the display stop signal. Next, the process progresses to Step S38. Otherwise, the illuminance measuring section 48 determines that the environment to which the mobile phone 1 is exposed is dark and outputs the display start signal. Next, the process returns to Step S36.

Next, in Step S38, the main controller 40 inputs the display stop signal output from the illuminance measuring section 48 to the display controller 43. The display controller 43 turns off the input section display device 34 based on the display stop signal, and then the process returns to Step S32. In this case, even if the environment to which the mobile phone 1 is exposed is dark, no operation of the mobile phone 1 by the user is performed within the threshold time. For this reason, it is determined that the need for perceiving the characters or symbols assigned to the keytops 19 is reduced. Therefore, even if the environment to which the mobile phone 1 is exposed is dark, the mobile phone 1 controls the input section display device 34 so as not to emit light, thereby suppressing the amount of power consumption of the battery pack.

Next, in Step S39, the main controller 40 inputs the display start signal to the display controller 43 based on the different character type display preparation signal output from the display controller 43. The display controller 43 turns on the input section display device 34 based on the display start signal. In this case, even if the environment to which the mobile phone 1 is exposed is bright or dark, the user can recognize the characters or symbols assigned to the keytops 19 from display of the label areas 16, as shown in FIG. 8, section (B), can recognize the characters or symbols assigned to the keytops 19 from the keytop display images.

Next, in Step S40, the input controller 42 compares a threshold time with a time elapsed after an arbitrary keytop 19 of the display function-equipped operation input section 15 is operated. Specifically, the input controller 42 compares a threshold time with a time elapsed after an arbitrary operation signal is output. When the time elapsed after the arbitrary operation signal is output is equal to or more than the threshold time, the input controller 42 determines that no operation of the mobile phone 1 by the user is performed within the threshold time and outputs the operation stop signal. Next, the process returns to Step S41. Otherwise, the input controller 42 determines that an operation of the mobile phone 1 by the user is performed within the threshold time and outputs the operation continuation signal. Next, the process returns to Step S40.

Next, in Step S41, the main controller 40 inputs the display stop signal to the display controller 43 based on the operation stop signal output from the input controller 42. The display controller 43 turns off the input section display device 34 based on the display stop signal. In this case, even if the environment to which the mobile phone 1 is exposed is dark, no operation of the mobile phone 1 by the user is performed within the threshold time. For this reason, it is determined that the need for perceiving the characters or symbols assigned to the keytops 19 is reduced. Therefore, even if the environment to which the mobile phone 1 is exposed is dark, the mobile phone 1 controls the input section display device 34 so as not to emit light, thereby suppressing the amount of power consumption of the battery pack.

Next, in Step S42, the main controller 40 determines whether or not an arbitrary keytop 19 of the display function-equipped operation input section 15 is operated. Specifically, if an arbitrary keytop 19 of the display function-equipped operation input section 15 is operated, the input controller 42 outputs an arbitrary operation signal. The main controller 40 monitors presence/absence of the input of the arbitrary operation signal. When an arbitrary operation signal is input, the main controller 40 determines that an arbitrary keytop 19 of the display function-equipped operation input section 15 is operated, and then the process returns to Step S39. Otherwise, the main controller 40 determines that an arbitrary keytop 19 of the display function-equipped operation input section 15 is not operated, and then the process returns to Step S42.

That is, when the character type labeled in the label areas 16 is the same as the character type of the keytop display images, the mobile phone 1 appropriately switches the turning-on state and the turning-off state of the input section display device 34 according to the use environment thereof, thereby suppressing power consumption. In addition, when the character type labeled in the label areas 16 is different from the character type of the keytop display images, the mobile phone 1 turns on the input section display device 34, regardless of the use environment thereof. Furthermore, the mobile phone 1 turns on or off the input section display device 34 according to presence/absence of the operation of the mobile phone 1 by the user. Therefore, the mobile phone 1 appropriately switches the turning-on state and the turning-off state of the input section display device 34 according to the use environment thereof, the character type labeled in the label areas 16, and presence/absence of an operation by the user, thereby suppressing power consumption.

As shown in FIG. 2, section (C), when the display direction of a character displayed in each of the label areas 16 is different from the display direction of a character to be displayed by the input section display device 34, the mobile phone 1 turns on the input section display device 34, regardless of the use environment thereof.

Figure 11:
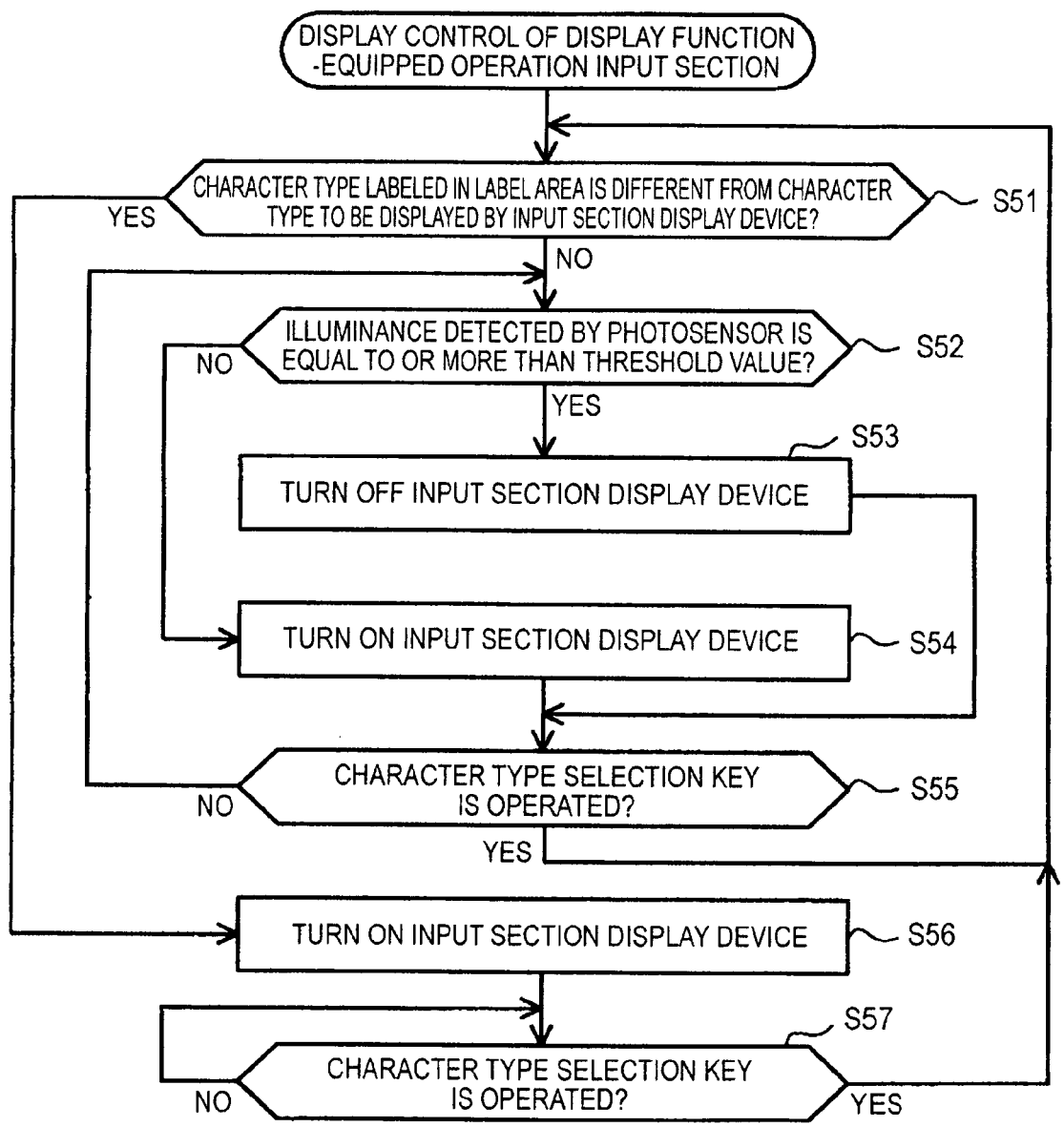
FIG. 11 is a flowchart showing yet another example of display control of the display function-equipped operation input section in the foldable mobile phone.

FIG. 11 is a flowchart showing yet another example of display control of the display function-equipped operation input section in the foldable mobile phone which is an example of the mobile apparatus according to the invention. As shown in FIG. 11, the mobile phone 1 controls turning-on or turning-off of the input section display device 34 according to whether or not the character type labeled in the label areas 16 is the same as the character type to be displayed by the input section display device 34. In addition, the mobile phone 1 switches the turning-on state and the turning-off state of the input section display device 34 according to the change of the character type to be input from the display function-equipped operation input section 15.

Steps S51, S52, and S56 of FIG. 11 are the same as Steps S21, S22, and S25 of FIG. 9, respectively, and thus redundant descriptions will be omitted.

In Step S53, the main controller 40 inputs the display stop signal output from the illuminance measuring section 48 to the display controller 43. The display controller 43 turns off the input section display device 34 or maintains the turning-off state of the input section display device 34 based on the display stop signal, and then the process returns to Step S55. In this case, since the environment to which the mobile phone 1 is exposed is bright, as shown in FIG. 8, section (A), the user can recognize the characters or symbols assigned to the keytops 19 from display of the label areas 16. Therefore, when the environment to which the mobile phone 1 is exposed is bright, the mobile phone 1 controls the input section display device 34 so as not to emit light, thereby suppressing the amount of power consumption of the battery pack.

Next, in Step S54, the main controller 40 inputs the display start signal output from the illuminance measuring section 48 to the display controller 43. The display controller 43 turns on the input section display device 34 or maintains the turning-on state of the light section display device 34 based on the display start signal. In this case, since the environment to which the mobile phone 1 is exposed is dark, as shown in FIG. 8, section (C), the user can recognize the characters or symbols assigned to the keytops 19 from display of the keytop display images.

Next, in Step S55, the main controller 40 determines whether or not the character type selection key 23 of the display function-equipped operation input section 15 is operated. Specifically, if the character type selection key 23 of the display function-equipped operation input section 15 is operated, the input controller 42 outputs a character type signal indicative of a character type being selected. The main controller 40 monitors presence/absence of the input of the character type signal. When the character type signal is input, the main controller 40 determines that the character type selection key 23 of the display function-equipped operation input section 15 is operated, and then the process returns to Step S51. Otherwise, the main controller 40 determines that the character type selection key 23 of the display function-equipped operation input section 15 is not operated, and then the process returns to Step S52.

Next, in Step S57, the main controller 40 determines whether or not the character type selection key 23 of the display function-equipped operation input section 15 is operated. Specifically, if the character type selection key 23 of the display function-equipped operation input section 15 is operated, the input controller 42 outputs a character type signal indicative of a character type being selected. The main controller 40 monitors presence/absence of the input of the character type signal. When the character type signal is input, the main controller 40 determines that the character type selection key 23 of the display function-equipped operation input section 15 is operated, and then the process returns to Step S51. Otherwise, the main controller 40 determines the character type selection key 23 of the display function-equipped operation input section 15is not operated, and then the process returns to Step S57.

That is, when the character type labeled in the label areas 16 is the same as the character type of the keytop display images, the mobile phone 1 appropriately switches the turning-on state and the turning-off state of the input section display device 34 according to the use environment thereof, thereby suppressing power consumption. In addition, when the character type labeled in the label areas 16 is different from the character type of the keytop display images, the mobile phone 1 turns on the input section display device 34, regardless of the user environment thereof. Furthermore, if a character type that can be input from the display function-equipped operation input section 15 is changed, the character type to be displayed by the input section display device 34 is also appropriately changed. Therefore, the mobile phone 1 appropriately switches the turning-on state and the turning-off state of the input section display device 34 according to the use environment thereof, the character type labeled in the label areas 16, and the change of the character type to be input from the display function-equipped operation input section 15, thereby suppressing power consumption.

When the display direction of a character displayed in each of the label areas 16 is different from the display direction of a character to be displayed by the input section display device 34, the mobile phone 1 turns on the input section display device 34, regardless of the use environment thereof.

Figure 12:
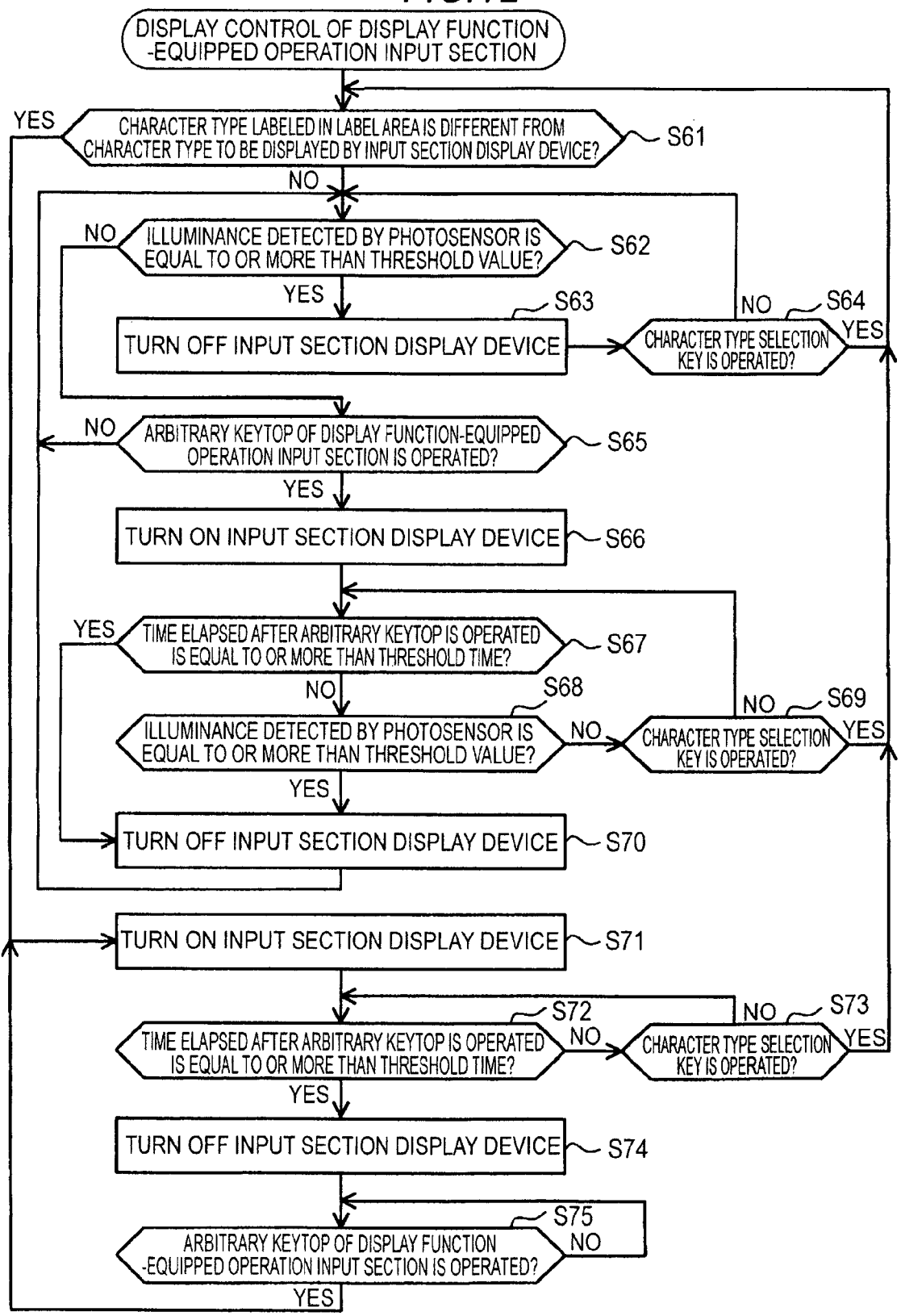
FIG. 12 is a flowchart showing yet another example of display control of the display function-equipped operation input section in the foldable mobile phone.

FIG. 12 is a flowchart showing another example of display control of the display function-equipped operation input section in the foldable mobile phone which is an example of the mobile apparatus according to the invention.

As shown in FIG. 12, the mobile phone 1 turns on or off the input section display device 34 according to whether or not the character type labeled in the label areas 16 is the same as the character type to be displayed by the input section display device 34. When the character type labeled in the label areas 16 is the same as the character type to be displayed by the input section display device 34, the mobile phone 1 does not immediately switch the turning-on state and the turning-off state of the input section display device 34 according to the use environment thereof, but stands by turning-on of the input section display device 34 until the user starts to operate the mobile phone 1. In addition, the mobile phone 1 switches the turning-on state and the turning-off state of the input section display device 34 according to the change of the character type to be input from the display function-equipped operation input section 15. Furthermore, if a threshold time elapses after the input section display device 34 is turned on until the user next operates the mobile phone 1, the mobile phone 1 turns off the input section display device 34.

Step S61 of FIG. 12 is the same as Step S21 of FIG. 9, and Steps S62, S65 to S67, S70, S71, S74, and S75 of FIG. 12 are the same as Steps S32, S34 to S36, S38, S39, S41, and S42 of FIG. 10, respectively. Thus, redundant descriptions will be omitted.

Next, in Step S63, the main controller 40 inputs the display stop signal output from the illuminance measuring section 48 to the display controller 43. The display controller 43 turns off the input section display device 34 or maintains the turning-off state of the input section display device 34 based on the display stop signal. In this case, since the environment to which the mobile phone 1 is exposed is bright, as shown in FIG. 8, section (A), the user can recognize the characters or symbols assigned to the keytops 19 from display of the label areas 16. Therefore, when the environment to which the mobile phone 1 is exposed is bright, the mobile phone 1 controls the input section display device 34 so as not to emit light, thereby suppressing the amount of power consumption of the battery pack.

Next, in Step S64, the main controller 40 determines whether or not the character type selection key 23 of the display function-equipped operation input section 15 is operated. Specifically, if the character type selection key 23 of the display function-equipped operation input section 15 is operated, the input controller 42 outputs a character type signal indicative of a character type being selected. The main controller 40 monitors presence/absence of the input of the character type. When the character type signal is input, the main controller 40 determines that the character type selection key 23 of the display function-equipped operation input section 15 is operated, and then the process returns to Step S61. Otherwise, the main controller 40 determines that the character type selection key 23 of the display function-equipped operation input section 15 is not operated, and then the process returns to Step S62.

Next, in Step S68, the illuminance measuring section 48 compares the illuminance detected by the photosensor 29 with the threshold value. When the illuminance detected by the photosensor 29 is equal to or more than the threshold value, the illuminance measuring section 48 determines that the environment to which the mobile phone 1 is exposed is bright and outputs the display stop signal. Next, the process returns to Step S70. Otherwise, the illuminance measuring section 48 determines that the environment to which the mobile phone 1 is exposed is dark and outputs the display start signal. Next, the process returns to Step S69.

Next, in Step S69, the main controller 40 determines whether or not the character type selection key 23 of the display function-equipped operation input section 15 is operated. Specifically, if the character type selection key 23 of the display function-equipped operation input section 15 is operated, the input controller 42 outputs a character type signal indicative of a character type being selected. The main controller 40 monitors presence/absence of the input of the character type signal. When the character type signal is input, the main controller 40 determines that the character type selection key 23 of the display function-equipped operation input section 15 is operated, and then the process returns to Step S61. Otherwise, the main controller 40 determines that the character type selection key 23 of the display function-equipped operation input section 15 is not operated, and then the process returns to Step S67.

Next, in Step S72, the input controller 42 compares a threshold time with a time elapsed after an arbitrary keytop 19 of the display function-equipped operation input section 15 is operated. Specifically, the input controller 42 compares a threshold time with a time elapsed after an arbitrary operation signal is output. When the time elapsed after the arbitrary operation signal is output is equal to or more than the threshold time, the input controller 42 determines that no operation of the mobile phone 1 by the user is performed within the threshold time and outputs the operation stop signal. Next, the process returns to Step S74. Otherwise, the input controller 42 determines that an operation of the mobile phone 1 by the user is performed and outputs the operation continuation signal. Next, the process returns to Step S73.

Next, in Step S73, the main controller 40 determines whether or not the character type selection key 23 of the display function-equipped operation input section 15 is operated. Specifically, if the character type selection key 23 of the display function-equipped operation input section 15 is operated, the input controller 42 outputs a character type signal indicative of a character type being selected. The main controller 40 monitors presence/absence of the input of the character type signal. When the character type signal is input, the main controller 40 determines that the character type selection key 23 of the display function-equipped operation input section 15 is operated, and then the process returns to Step S61. Otherwise, the main controller 40 determines that the character type selection key 23 of the display function-equipped operation input section 15 is not operated, and then the process returns to Step S72.

That is, when the environment to which the mobile phone 1 is exposed is bright, the mobile phone 1 turns off the input section display device 34. In contrast, when the environment to which the mobile phone 1 is exposed is dark, the mobile phone 1 turns on or off the input section display device 34 according to presence/absence of the operation of the mobile phone 1 by the user. When the environment to which the mobile phone 1 is exposed is bright, the user recognizes the characters or symbols assigned to the keytops 19 from display of the label areas 16. When the environment to which the mobile phone 1 is exposed is dark, if the mobile phone 1 is operated, the user recognizes the characters or symbols assigned to the keytops 19 from display of the keytop display images. In addition, when the character type labeled in the label areas 16 is the same as the character type of the keytop display images, the mobile phone 1 appropriately switches the turning-on state and the turning-off state of the input section display device 34 according to the use environment thereof, thereby suppressing power consumption. Furthermore, when the character type labeled in the label areas 16 is different from the character type of the keytop display images, the mobile phone 1 turns on the input section display device 34, regardless of the use environment thereof. Furthermore, if a character type that can be input from the display function-equipped operation input section 15 is changed, the character type to be displayed by the input section display device 34 is also appropriately changed. Therefore, the mobile phone 1 appropriately switches the turning-on state and the turning-off state of the input section display device 34 according to the use environment thereof, the character type labeled in the label areas 16, presence/absence of the user's operation, and the change of the character type to be input from the display function-equipped operation input section 15, thereby suppressing power consumption.

When the display direction of a character displayed in each of the label areas 16 is different from the display direction of a character to be displayed by the input section display device 34, the mobile phone 1 turns on the input section display device 34, regardless of the use environment thereof.

As a result, the mobile apparatus according to this embodiment includes the keytops 19 on which arbitrary images can be displayed, can realize very low power consumption, and can be used over a long time.

The invention may be applied to, in addition to the mobile phone 1, a Personal Digital Assistant (PDA), a personal computer, a portable game machine, a portable music player, a portable motion picture player, and other mobile apparatuses.

A series of processing described in the embodiment of the invention may be performed by software or may be performed by hardware.

Although in the embodiment of the invention, an example where the steps in the flowchart are performed in time series according to the described sequence has been described, the steps may be not necessarily performed in time series. For example, the steps maybe performed in parallel or individually.

What is claimed is:

1. A mobile apparatus comprising:
   a plurality of input sections each configured to display at least one image that corresponds to an input value assigned thereto;
   a plurality of label areas provided correspondingly to the plurality of input sections, each of the label areas labeled with at least one character associated with the input value that is assigned to a corresponding one of the plurality of input sections;
   a photosensor configured to measure ambient illuminance; and
   a display controller configured to control turn-off and turn-on of image-display at the plurality of input sections based on the ambient illuminance, wherein:
   the display controller is configured to turn off the image-display when the ambient illuminance is a threshold value or more, and to turn on the image-display when the ambient illuminance is less than the threshold value;
   the display controller is configured to turn off the image-display when a character type of the image-display is the same as a character type labeled in the label areas, and when the ambient illuminance is the threshold value or more;
   the display controller is configured to turn on the image-display when the character type of the image-display is the same as the character type labeled in the label areas, and when the ambient illuminance is less than the threshold value; and
   the display controller is configured to turn on the image-display when the character type of the image-display is different from the character type labeled in the label areas.

2. The mobile apparatus of claim 1, wherein the display controller is configured to turn on the image-display when the ambient illuminance is less than the threshold value and when at least one of the input sections are operated.

3. The mobile apparatus of claim 2, wherein the display controller is configured to turn off the image-display when the input sections are not operated before a threshold time elapses.

4. The mobile apparatus of claim 3, wherein the display controller is configured to turn on the image-display when the character type of the image-display is different from the character type labeled in the label areas and when at least one of the input sections is operated.

5. The mobile apparatus of claim 4, wherein the display controller is configured to turn on the image-display more brightly as the ambient illuminance becomes smaller, when the ambient illuminance is less than the threshold value.

6. The mobile apparatus of claim 2, wherein the display controller is configured to turn on the image-display more brightly as the ambient illuminance becomes smaller, when the ambient illuminance is less than the threshold value.

7. The mobile apparatus of claim 3, wherein the display controller is configured to turn on the image-display more brightly as the ambient illuminance becomes smaller, when the ambient illuminance is less than the threshold value.

8. The mobile apparatus of claim 1, wherein, the display controller is configured to turn on the image-display when a direction of the image-display is different from a direction of the at least one characters labeled in the label area.

9. The mobile apparatus of claim 8, wherein the display controller is configured to turn on the image-display more brightly as the ambient illuminance becomes smaller, when the ambient illuminance is less than the threshold value.

10. The mobile apparatus of claim 1, wherein the display controller is configured to turn on the image-display more brightly as the ambient illuminance becomes smaller, when the ambient illuminance is less than the threshold value.

* * * * *

UNITED STATES PATENT AND TRADEMARK OFFICE
CERTIFICATE OF CORRECTION

PATENT NO. : 8,094,126 B2
APPLICATION NO. : 12/392244
DATED : January 10, 2012
INVENTOR(S) : Yasuda et al.

It is certified that error appears in the above-identified patent and that said Letters Patent is hereby corrected as shown below:

Title page, item (73), under "Assignee", in Column 1, Line 2, delete "Communications," and insert -- Communications Limited, --, therefor.

Signed and Sealed this
Seventh Day of August, 2012

David J. Kappos
*Director of the United States Patent and Trademark Office*